US012002248B2

(12) United States Patent
Su et al.

(10) Patent No.: US 12,002,248 B2
(45) Date of Patent: Jun. 4, 2024

(54) IMAGE SPLICING METHOD, COMPUTER-READABLE STORAGE MEDIUM, AND COMPUTER DEVICE

(71) Applicant: ARASHI VISION INC., Shenzhen (CN)

(72) Inventors: Tan Su, Shenzhen (CN); Fei Gao, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/267,505

(22) PCT Filed: Dec. 16, 2021

(86) PCT No.: PCT/CN2021/138909
§ 371 (c)(1),
(2) Date: Jun. 15, 2023

(87) PCT Pub. No.: WO2022/127875
PCT Pub. Date: Jun. 23, 2022

(65) Prior Publication Data
US 2024/0046596 A1 Feb. 8, 2024

(30) Foreign Application Priority Data
Dec. 16, 2020 (CN) .......................... 202011490499.0

(51) Int. Cl.
G06V 10/10 (2022.01)
G06T 3/00 (2024.01)
(Continued)

(52) U.S. Cl.
CPC ................ G06V 10/16 (2022.01); G06T 3/08 (2024.01); G06T 5/50 (2013.01); G06T 7/80 (2017.01);
(Continued)

(58) Field of Classification Search
None
See application file for complete search history.

(56) References Cited

U.S. PATENT DOCUMENTS 10,136,055 B2 * 11/2018 Lei .................... G06T 3/0018
2012/0274739 A1 * 11/2012 Li .............................. G06T 7/85
348/E5.031

(Continued)

OTHER PUBLICATIONS

S. Liu, J. Chen, M. Sun, L. Zhao, X. Wei and H. Guo, "A 3D Spherical Panorama Modeling Method Based on Double Projective Geometry," in IEEE Access, vol. 8, pp. 197542-197553, 2020, doi: 10.1109/ACCESS.2020.3028421. (Year: 2020).*

(Continued)

Primary Examiner — James A Thompson
(74) Attorney, Agent, or Firm — IPRO, PLLC

(57) ABSTRACT

The present application is applicable to the field of image processing, and provides an image splicing method and apparatus, a computer-readable storage medium, a computer device, and cameras. The method comprises: calculating a first mapping table corresponding to a lens of each camera according to internal parameters of the lens of each camera, and according to the first mapping table, projecting images collected by the corresponding lens of each camera at the same time onto a unit sphere to obtain multiple first spherical images corresponding to the lens of each camera; according to external parameters of the lens of each camera and the distance from the centers of circles formed by optical centers of the lens of multiple cameras and a preset plane above or below the circles, calculating a second mapping table corresponding to the lens of each camera, mapping the multiple first spherical images to a unified unit sphere according to the second mapping table, and splicing the first spherical images to obtain a panoramic spherical image. The present application can obtain more natural and realistic picture spliced at the top and bottom.

19 Claims, 4 Drawing Sheets

(51) Int. Cl.
*G06T 3/08* (2024.01)
*G06T 5/50* (2006.01)
*G06T 7/80* (2017.01)
*G06V 10/74* (2022.01)
*H04N 23/90* (2023.01)

(52) U.S. Cl.
CPC .......... *G06V 10/761* (2022.01); *H04N 23/90* (2023.01); *G06T 2207/20221* (2013.01)

(56) References Cited

U.S. PATENT DOCUMENTS

| | | | | |
|---|---|---|---|---|
| 2018/0249088 A1* | 8/2018 | Chang | .................. | H04N 17/002 |
| 2019/0220952 A1* | 7/2019 | Lee | ...................... | G06T 3/4038 |
| 2021/0044725 A1* | 2/2021 | Powell | .................. | H04N 23/54 |
| 2021/0082086 A1* | 3/2021 | Bichu | .................... | G06T 5/002 |
| 2021/0233274 A1* | 7/2021 | Silva | ......................... | G06T 7/80 |
| 2022/0124298 A1* | 4/2022 | Chen | ......................... | H04N 9/64 |

OTHER PUBLICATIONS

Y. Liu, B. Zhang, N. Liu, H. Li and J. Zhu, "Fisheye image Distortion Correction Based on Spherical Perspective Projection Constraint," 2020 IEEE International Conference on Mechatronics and Automation (ICMA), Beijing, China, 2020, pp. 1066-1070, doi: 10.1109/ICMA49215.2020.9233684. (Year: 2020).*

S. Chan, X. Zhou, C. Huang, S. Chen and Y. F. Li, "An improved method for fisheye camera calibration and distortion correction," 2016 International Conference on Advanced Robotics and Mechatronics (ICARM), Macau, China, 2016, pp. 579-584, doi: 10.1109/ICARM.2016.7606985. (Year: 2016).*

* cited by examiner

IMAGE SPLICING METHOD, COMPUTER-READABLE STORAGE MEDIUM, AND COMPUTER DEVICE

TECHNICAL FIELD OF THE INVENTION

The present application relates to the field of image processing, and in particular, relates to an image splicing method and apparatus, a computer-readable storage medium, a computer device, and cameras.

BACKGROUND OF THE INVENTION

Image splicing in the prior art is usually implemented in the following manner: firstly, spherical coordinates of each pixel with an optical center of a lens serving as the center of sphere are obtained by using internal parameters of lens obtained by calibration; then, the position in a unified spherical coordinate system is calculated by rotation of coordinates, wherein the rotation amount of the rotation of coordinates is obtained by angular relationships (external parameters) between multiple lens; after obtaining the mapping from a single picture pixel to the unified spherical coordinates, pictures shot by each of the lens can be mapped to the spherical surface and finally combined into a complete image.

Due to the fact that the positions of the optical centers of the lens do not coincide, parallax exists between the lens, so that the pixels of the same object in different lens may be mapped to different positions in the final picture, which results in picture dislocation at seams between areas managed by different lens on the spherical surface. The general processing method in the prior art is to properly increase the field of view of the lens so that the fields of view of adjacent lens partially overlap, then analyze the overlapping areas at the seams to find out the dense matching in the overlapping areas by using an optical flow method or a feature point method, and then modify the mapping table to achieve overlapping at the seams as much as possible, thereby eliminating the splicing error. In the prior art, overlapping areas of pictures for two adjacent lens are processed by a splicing optimization method based on dense matching between pictures, so that splicing errors between pictures of two lens can be well eliminated.

At present, most panoramic cameras on the market adopt multiple lens (specifically three or more lens) which are arranged radially outward in an annular arrangement around the center of the camera; when shooting, the panorama camera is placed horizontally, and each of the lens faces different horizontal directions, each of the lens is responsible for shooting a part of the complete field of vision around the panorama camera from different perspectives, and the pictures shot by the multiple lens are spliced to form a panoramic sphere centered on the position of the panorama camera. However, for such most common panorama camera structure in which multiple lens are arranged in an annular manner, the bottom and top of the panoramic sphere are spliced with all the lens images; from the viewer's perspective of the panoramic image, the top and bottom areas of the panoramic sphere are spliced with multiple fan-shaped images respectively, and all the splicing seams converge at the center; due to the parallax between lens, the dislocation between the pictures is serious, which makes splicing errors such as alignment errors and picture distortion occur to the top and bottom splicing of the panorama camera; in order to obtain better image quality, professional-grade panorama cameras generally adopt larger-volume image sensors and more lens, which leads to larger parallax between lens and more serious splicing errors at the top/bottom areas. Meanwhile, the method for eliminating seam dislocation between two lens in the prior art cannot solve the problem of simultaneous dislocation between multiple lens, and thus natural top/bottom pictures cannot be obtained.

SUMMARY OF THE INVENTION

Embodiments of the present application provide an image splicing method and apparatus, a computer-readable storage medium, a computer device, and an image collecting device which are intended to solve one of the above problems.

According to a first aspect, the present application provides an image splicing method, and the method includes:
  acquiring internal parameters and external parameters of lens of multiple cameras, the distance from the centers of circles formed by the optical centers of the lens of the multiple cameras to a preset plane above or below the circles, and multiple images collected by the multiple cameras respectively, wherein the multiple images are images collected by the lens of the multiple cameras at the same time respectively;
  according to the internal parameters of the lens of each camera, calculating a first mapping table corresponding to the lens of each camera; and according to the first mapping table corresponding to the lens of each camera, projecting images collected by the corresponding lens of each camera at the same time onto a unit sphere to obtain multiple first spherical images respectively corresponding to the lens of each camera;
  according to the external parameters of the lens of each camera and the distance from the centers of circles formed by the optical centers of the lens of the multiple cameras to a preset plane above or below the circles, calculating a second mapping table corresponding to the lens of each camera, and mapping the multiple first spherical images respectively corresponding to the lens of each camera to a unified unit sphere according to the second mapping table corresponding to the lens of each camera, and splicing the first spherical images to obtain a panoramic spherical image.

According to a second aspect, the present application provides an image splicing apparatus, and the apparatus includes:
  an acquisition module, being configured to respectively acquire internal parameters and external parameters of lens of multiple cameras, the distance from the centers of circles formed by the optical centers of the lens of the multiple cameras to a preset plane above or below the circles, and multiple images collected by the multiple cameras respectively, wherein the multiple images are images collected by the lens of the multiple cameras at the same time respectively;
  a first mapping module, being configured to calculate a first mapping table corresponding to the lens of each camera according to the internal parameters of the lens of each camera, and project images collected by the corresponding lens of each camera at the same time onto a unit sphere according to the first mapping table corresponding to the lens of each camera so as to obtain multiple first spherical images respectively corresponding to the lens of each camera;
  a second mapping module, being configured to calculate a second mapping table corresponding to the lens of each camera according to the external parameters of the lens of each camera and the distance from the centers of circles formed by the optical centers of the lens of the multiple cameras to a preset plane above or below the circles, and map the multiple first spherical images respectively corresponding to the lens of each camera to a unified unit sphere according to the second mapping table corresponding to the lens of each camera, and splice the first spherical images to obtain a panoramic spherical image.

According to a third aspect, the present application provides a computer-readable storage medium storing a computer program, and the computer program, when executed by a processor, implements the steps of the image splicing method as described above.

According to a fourth aspect, the present application provides a computer device, which includes:
one or more processors;
a memory; and
one or more computer programs, the processor being connected with the memory by means of a bus, wherein the one or more computer programs are stored in the memory and configured to be executed by the one or more processors, and the processor implements the steps of the image splicing method as described above when executing the computer program.

According to a fifth aspect, the present application provides an image collecting device, which includes:
one or more processors;
a memory; and
one or more computer programs, the processor being connected with the memory by means of a bus, wherein the one or more computer programs are stored in the memory and configured to be executed by the one or more processors, and the processor implements the steps of the image splicing method as described above when executing the computer program.

In the embodiments of the present application, sources of parallax between lens of multiple cameras (different positions of optical centers for lens) are introduced into the calculation of mapping tables, and it is assumed that areas above or below circles formed by the optical centers of the lens of the multiple cameras are a plane with a fixed height, a second mapping table corresponding to the lens of each camera is calculated according to the external parameters of the lens of each camera and the distance from the centers of circles formed by the optical centers of the lens of the multiple cameras to a preset plane above or below the circles, and multiple first spherical images respectively corresponding to the lens of each camera are mapped to a unified unit sphere according to the second mapping table corresponding to the lens of each camera, and the first spherical images are spliced to obtain a panoramic spherical image. In this way, not only the alignment error caused by parallax is solved, but a simple calculation process is still kept, and the complex calculation amount and the error risk caused by traditional three-dimensional reconstruction are avoided; and through actual testing, for photos and videos shot by image collecting devices statically placed in general indoor and outdoor environments, more natural and more real pictures spliced at the top and bottom can be obtained by using the image splicing method of the present application.

DETAILED DESCRIPTION OF THE INVENTION

In order to make objectives, technical solutions, and beneficial effects of the present application clearer, the present application will be further described in detail hereinafter with reference to accompanying drawings and embodiments. It shall be appreciated that, the specific embodiments described herein are merely used to explain the present application, and are not intended to limit the present application.

In order to illustrate the technical solutions described in the present application, the following description is made by specific embodiments.

Figure 1:
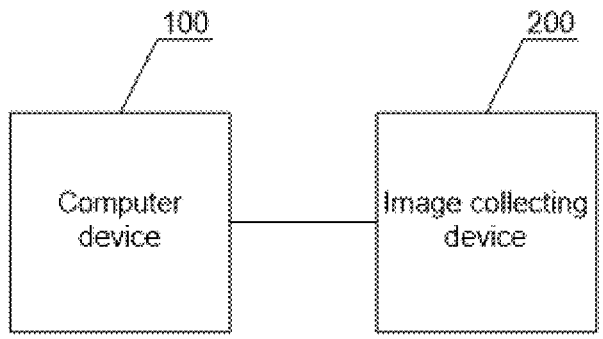
FIG. 1 is a schematic view of an application scenario of an image splicing method according to an embodiment of the present application.

The application scenario of an image splicing method provided according to an embodiment of the present application may be a computer device or an image collecting device, and the computer device or the image collecting device executes the image splicing method provided according to an embodiment of the present application to splice images photographed by multiple cameras, the multiple cameras may belong to one image collecting device or belong to multiple image collecting devices, and the image collecting device may be a device having an image collecting function such as a mobile terminal and a camera, which is not specifically limited in the present application. The application scenario of the image splicing method provided according to an embodiment of the present application may also include a computer device 100 and an image collecting device 200 (as shown in FIG. 1) connected to each other. At least one application program may be run in the computer device 100 and the image collecting device 200. The computer device 100 may be a server, a desktop computer, a mobile terminal or the like, and the mobile terminal includes a mobile phone, a tablet computer, a notebook computer, a personal digital assistant or the like. The computer device 100 or the image collecting device 200 executes the image splicing method provided according to an embodiment of the present application to splice images photographed by multiple cameras.

Figure 2:
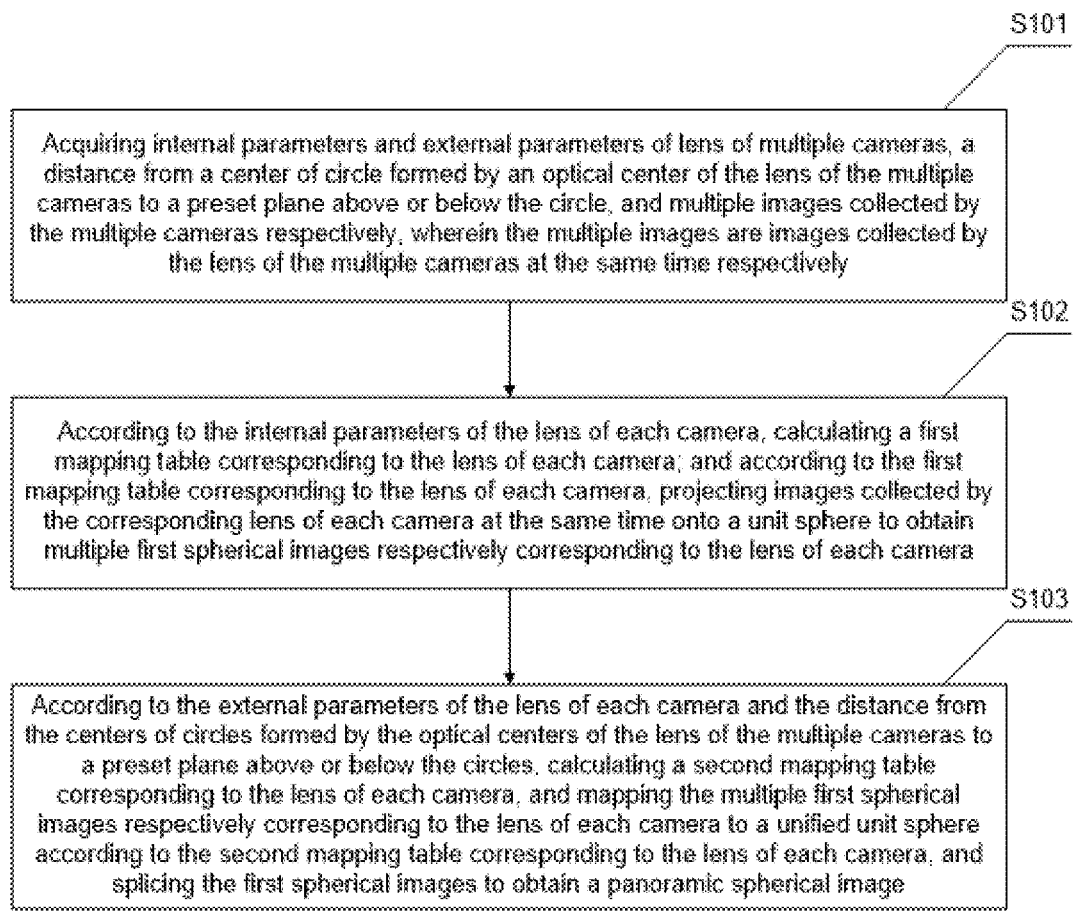
FIG. 2 is a flowchart diagram of an image splicing method according to an embodiment of the present application.

Referring to FIG. 2, which is a flowchart diagram of an image splicing method according to an embodiment of the present application, this embodiment mainly takes the case where the image splicing method is applied to a computer device or an image collecting device as an example for illustration, and the image splicing method provided according to an embodiment of the present application includes the following steps:

S101: acquiring internal parameters and external parameters of lens of multiple cameras, a distance from a center of circle formed by an optical center of the lens of the multiple cameras to a preset plane above or below the circle, and multiple images collected by the multiple cameras respectively, wherein the multiple images are images collected by the lens of the multiple cameras at the same time respectively.

In an embodiment of the present application, the number of the multiple cameras is n, n is an integer greater than or equal to 2, and the cameras are used to capture images and/or videos, and they may include components such as lens and image sensors. The lens of the camera may be a wide-angle lens, an ultra-wide-angle lens, or other lens.

When the multiple cameras belong to one or more image collecting devices, the internal parameters are obtained by factory calibration of the image collecting devices. The internal parameters are used to describe the pixel position of the image sensor and a mapping relationship in the direction from the optical center of the lens to the object to which the pixel belongs, and according to the internal parameters, spherical coordinates of each pixel with the optical center of the lens serving as the center of sphere can be obtained, and the internal parameters include the focal length, the position of the optical axis center point in the original image, the lens distortion parameter or the like.

When the multiple cameras belong to one image collecting device, the external parameters are obtained by factory calibration of the image collecting device. When the multiple cameras belong to multiple image collecting devices, the external parameters are obtained by calculation. The external parameters include a rotation matrix of the lens relative to a reference lens and the position of the optical center of the lens relative to the centers of circles formed by the optical centers of the lens of the multiple cameras, coordinates of each lens can be obtained according to the external parameters, and the reference lens is any of the lens of the multiple cameras.

When the number of the multiple cameras is 2, each of the lens points to different directions, and the center of circle formed by the optical center of the lens of the multiple cameras refer to the centers of circle formed with the optical centers of the lens of the two cameras as the diameter.

When the number of the multiple cameras is an integer greater than 2, the lens of the multiple cameras are annularly arranged, and each of the lens points to different directions; the optical axes of the lens of the multiple cameras generally intersect with the centers of circles formed by the optical centers of the lens of the multiple cameras, the centers of circles formed by the optical centers of the lens of the multiple cameras are the center of the circle formed by the annular arrangement of the lens of the multiple cameras, and the photo-centers of the lens of the multiple cameras are generally located on the circles formed by the optical centers of the lens of the multiple cameras.

In an embodiment of the present application, if the multiple cameras are placed in a room, then the distance from the centers of circles formed by the optical centers of the lens of the multiple cameras to a preset plane above the circles may be the distance from the centers of circles to the top of the room (when the multiple cameras are horizontally placed on the indoor ground, the top of the room refers to a ceiling, and if the multiple cameras are vertically placed on the indoor ground, the top of the room refers to the side wall of the room that is parallel to and above the circles formed by the optical centers of the lens of the multiple cameras), while the distance from the centers of circles formed by the optical centers of the lens of the multiple cameras to a preset plane below the circles may be the distance from the centers of circles to the bottom of the room (when the multiple cameras are horizontally placed on the indoor ground, the bottom of the room refers to the ground, and if the multiple cameras are vertically placed on the indoor ground, the bottom of the room refers to the side wall of the room that is parallel to and below the circles formed by the optical centers of the lens of the multiple cameras).

The distance from the centers of circles formed by the optical centers of the lens of the multiple cameras to a preset plane above or below the circles may be specifically acquired by the following operation:

acquiring the distance from the centers of circles formed by the optical centers of the lens of the multiple cameras to a preset plane above or below the circles by using a distance sensor; or.

automatically estimating the distance from the centers of circles formed by the optical centers of the lens of the multiple cameras to a preset plane above or below the circles.

The operation of automatically estimating the distance from the centers of circles formed by the optical centers of the lens of the multiple cameras to a preset plane above or below the circles may specifically include the following steps:

S1011. selecting multiple distances within a preset distance range, wherein the multiple distances are distances from the centers of circles formed by the optical centers of the lens of the multiple cameras to multiple preset planes above or below the circles, and for each of the distances selected, respectively calculating a second mapping table corresponding to the lens of each camera according to the external parameters of the lens of each camera and each of the distances.

The operation of selecting multiple distances within a preset distance range may specifically include:

letting the vertical viewing angle of the lens be $\alpha$, and letting the average distance from the lens of each camera to the centers of circles formed by the optical centers of the lens of the multiple cameras be r, and m different distances are trialed in order of size, wherein m is an integer greater than or equal to 2, m may be preset or may be determined by the user according to actual situations, for example, m=20, and the calculation method for the jth distance $d_j$ trialed is as follows:

$$d_j = r \cdot \arctan(2/(\alpha-\pi) \cdot m/j), j \in [1, m]$$

In an embodiment of the present application, the maximum distance of the preset distance range is infinity, and the minimum distance is determined by the vertical viewing angle of the lens. That is, the object smaller than the distance is outside the field of view of the lens. The minimum distance is $r \cdot \arctan(2/(\alpha-\pi))$, and $\alpha$ is greater than 180°.

S1012: mapping multiple first spherical images respectively corresponding to the lens of each camera to the unified unit sphere according to the second mapping table corresponding to the lens of each camera to obtain multiple unified unit spherical images respectively corresponding to the lens of each camera.

For example, if 20 different distances are trialed, then 20 unified unit spherical images respectively corresponding to the lens of each camera are obtained.

S1013. for each of the unified unit spherical images corresponding to the lens of each camera, projecting a part of the upper hemisphere of the unified unit spherical image to a plane which is at the selected distance from the centers of circles formed by the optical centers of the lens of the multiple cameras and above the circles according to the plane projection mode so as to obtain top projection pictures, and projecting a part of the lower hemisphere of the unified unit spherical image to a plane which is at the selected distance from the centers of circles formed by the optical centers of the lens of the multiple cameras and below the circles according to the plane projection mode so as to obtain bottom projection pictures.

S1014: calculating an overall alignment error of the top projection pictures or the bottom projection pictures; and taking the distance corresponding to the minimum overall alignment error of the top projection pictures or the bottom projection pictures as the distance from the centers of circles formed by the optical centers of the lens of the multiple cameras to a preset plane above or below the circles.

For example, if 20 different distances are trialed, then the overall alignment error of 20 top projection pictures or bottom projection pictures is calculated, and the distance corresponding to the minimum overall alignment error of the top projection pictures or the bottom projection pictures is taken as the distance from the centers of circles formed by the optical centers of the lens of the multiple cameras to a preset plane above or below the circles.

The operation of calculating an overall alignment error of the top projection pictures or the bottom projection pictures may specifically include:

for the lens of each camera, respectively calculating an average pixel error within the overlapping area between the top projection pictures or the bottom projection pictures corresponding to the lens of two cameras adjacent to the lens of each camera;

calculating the sum of the average pixel errors of the lens of all the cameras as the overall alignment error of the top projection pictures or the bottom projection pictures.

The operation of calculating the overall alignment error of the top projection pictures or the bottom projection pictures may be specifically implemented by the following equation $E(d_j)=\Sigma_i^n D(P_{i,j}, P_{i+1,j})$, wherein $E(d_j)$ represents the overall alignment error of the top projection pictures or the bottom projection pictures at the jth distance $d_j$ trialed, $D(P_{i,j}, P_{i+1,j})$ represents the average pixel error at the jth distance $d_j$ trialed within the overlapping area between the top projection pictures or the bottom projection pictures corresponding to the lens of the ith camera and the lens of the (i+1)th camera which are adjacent to each other.

S102: according to the internal parameters of the lens of each camera, calculating a first mapping table corresponding to the lens of each camera; and according to the first mapping table corresponding to the lens of each camera, projecting images collected by the corresponding lens of each camera at the same time onto a unit sphere to obtain multiple first spherical images respectively corresponding to the lens of each camera.

In an embodiment of the present application, the unit sphere may specifically be a unit sphere with the optical center of the lens serving as the center of sphere.

S103. according to the external parameters of the lens of each camera and the distance from the centers of circles formed by the optical centers of the lens of the multiple cameras to a preset plane above or below the circles, calculating a second mapping table corresponding to the lens of each camera, and mapping the multiple first spherical images respectively corresponding to the lens of each camera to a unified unit sphere according to the second mapping table corresponding to the lens of each camera, and splicing the first spherical images to obtain a panoramic spherical image.

In an embodiment of the present application, the unified unit sphere is specifically a unit sphere with the centers of circles formed by the optical centers of the lens of the multiple cameras serving as the center of sphere.

The core idea of calculating the second mapping table is as follows: it is assumed that all the pixels at the upper part of the image are all on a certain plane that is parallel to and above the circles formed by the optical centers of the lens of the multiple cameras, while all the pixels at the lower part of the image are all on a certain plane that is parallel to and below the circles formed by the optical centers of the lens of the multiple cameras. Therefore, it differs from the existing method in the space model, the method for calculating the mapping table in the prior art ignores position differences between the centers of circles formed by the optical centers of the lens of the multiple cameras and the optical centers of the lens of each camera, and thus it assumes that all the pixels are on an infinite spherical surface, and the centers of circles formed by the optical centers of the lens of the multiple cameras are located at the center of sphere. However, in an embodiment of the present application, the images around the multiple cameras are imagined into two infinite parallel planes, and the centers of circles formed by the optical centers of the lens of the multiple cameras are at a finite distance from each of the two planes.

In an embodiment of the present application, the operation of calculating a second mapping table corresponding to the lens of each camera according to the external parameters of the lens of each camera and the distance from the centers of circles formed by the optical centers of the lens of the multiple cameras to a preset plane above or below the circles may specifically be implemented according to the following equations:

$$p_{i0}^s = R_i \cdot p_i^s = [p_{i0x}^s, p_{i0y}^s, p_{i0z}^s],$$

$$p_{i1}^s = \begin{cases} d_1/p_{i0z}^s \cdot p_{i0}^s c_i, & p_{i0z}^s \geq 0 \\ d_2/-p_{i0z}^s \cdot p_{i0}^s - c_i, & p_{i0z}^s < 0 \end{cases},$$

$$p_i^{\bar{s}} = f_2(p_i^s) = p_{i1}^s/|p_{i1}^s|,$$

wherein $f_2(p_i^s)$ is the second mapping table which represents the mapping of three-dimensional coordinates $p_i^s$ of of a pixel point on a first spherical image of a lens of the ith camera to three-dimensional coordinates $p_i^{\bar{s}}$ of the pixel point on the unified unit sphere, $1 \leq i \leq n$, n is the number of lens of the camera, $R_i$ is a rotation matrix of the lens of the ith camera relative to a reference lens, and $c_i$ is the position of the lens of the ith camera relative to the centers of circles formed by the optical centers of the lens of the multiple cameras, which is expressed in three-dimensional coordinates; $d_1$ is the distance from the centers of circles formed by the optical centers of the lens of the multiple cameras to a preset plane above the circles, and $d_2$ is the distance from the centers of circles formed by the optical centers of the lens of the multiple cameras to a preset plane below the circles.

A specific description of the above equations is as follows: a three-dimensional point $p_i^s$ on the first spherical image is first rotated and transformed by $R_i$. The point after the rotation and transformation is wrote as $p_{io}^s$, and the three-dimensional coordinates thereof are respectively represented by $[p_{iox}^s, p_{ioy}^s, p_{ioz}^s]$; then, the coordinates of the pixel on a certain plane above or below the circles may be calculated and recorded as $p_{i1}^s$ by using the coordinate $c_i$ of the lens of the camera relative to the centers of circles formed by the optical centers of the lens of the multiple cameras as well as distances $d_1$ and $d_2$ from a preset plane above or below the circles to the centers of circles; finally, coordinates $p_i^s$ of the pixel on the unified unit sphere with the centers of circles formed by the optical centers of the lens of the multiple cameras serving as the center of sphere are obtained by normalization.

Although the coordinates of the lens of each camera have been obtained by calibration of the external parameters, sometimes it is not possible to completely align all the pictures by simply using a uniform distance from the preset plane because the calibration precision is insufficient; therefore, the height of the lens of each camera can be optimized one by one based on the estimated distance from the centers of circles formed by the optical centers of the lens of the multiple cameras to a preset plane above or below the circles, and only the alignment condition between the lens of the camera and the lens of two cameras adjacent thereto are considered during the optimization. In an embodiment of the present application, after the operation of taking the distance corresponding to the minimum overall alignment error of the top projection pictures or the bottom projection pictures as the distance from the centers of circles formed by the optical centers of the lens of the multiple cameras to a preset plane above or below the circles, the method may further include the following steps:

according to the estimated distance from the centers of circles formed by the optical centers of the lens of the multiple cameras to a preset plane above or below the circles, controlling to adjust the distance from the lens of each camera to the preset plane so that the alignment error between the lens of each camera and the lens of two cameras adjacent thereto is minimum, and taking the distance from the lens of the camera to the preset plane when the alignment error between the lens of each camera and the lens of two cameras adjacent thereto is minimum as the final distance from the lens of the camera to a preset plane above or below the circle;

calculating a third mapping table corresponding to the lens of each camera respectively according to the external parameters of the lens of each camera and the final distance from the lens of the camera to a preset plane above or below the circle;

then in S103, the operation of splicing the first spherical images to obtain a panoramic spherical image may specifically include: mapping multiple first spherical images respectively corresponding to the lens of each camera to a unified unit sphere according to the third mapping table corresponding to the lens of each camera, and splicing the first spherical images to obtain a panoramic spherical image.

In an embodiment of the present application, the operation of controlling to adjust the distance from the lens of each camera to the preset plane according to the estimated distance from the centers of circles formed by the optical centers of the lens of the multiple cameras to a preset plane above or below the circles so that the alignment error between the lens of each camera and the lens of two cameras adjacent thereto is minimum may specifically include the following steps:

respectively calculating a second mapping table corresponding to the lens of each camera according to the external parameters of the lens of each camera and the estimated distance from the centers of circles formed by the optical centers of the lens of the multiple cameras to a preset plane above or below the circles;

mapping multiple first spherical images respectively corresponding to the lens of each camera to an unified unit sphere according to the second mapping table corresponding to the lens of each camera to obtain multiple unified unit spherical images respectively corresponding to the lens of each camera;

for each of the unified unit spherical images corresponding to the lens of each camera, projecting a part of the upper hemisphere of the unified unit spherical image to a plane which is at the selected distance from the centers of circles formed by the optical centers of the lens of the multiple cameras and above the circles according to the plane projection mode so as to obtain top projection pictures, and projecting a part of the lower hemisphere of the unified unit spherical image to a plane which is at the selected distance from the centers of circles formed by the optical centers of the lens of the multiple cameras and below the circles according to the plane projection mode so as to obtain bottom projection pictures;

according to the top projection pictures or the bottom projection pictures corresponding to the lens of each camera, calculating an alignment error between the lens of each camera and the lens of two cameras adjacent thereto, and sorting the lens of all the cameras in a descending order according to the alignment error; the operation of calculating an alignment error between the lens of each camera and the lens of two cameras adjacent thereto according to the top projection pictures or the bottom projection pictures corresponding to the lens of each camera may specifically include: calculating an average pixel error within the overlapping area between the top projection pictures or the bottom projection pictures corresponding to the lens of each camera and the lens of two cameras adjacent thereto;

starting from the lens of the camera with the maximum alignment error, adjusting the height of the lens in the vicinity of the estimated distance from the centers of circles formed by the optical centers of the lens of the multiple cameras to a preset plane above or below the circles until the alignment error is minimum; the operation of adjusting the height of the lens in the vicinity of the estimated distance from the centers of circles formed by the optical centers of the lens of the multiple cameras to a preset plane above or below the circles may specifically include: recording the estimated distance from the centers of circles formed by the optical centers of the lens of the multiple cameras to a preset plane above or below the circles as d, and the adjusting distance from each of the lens of each camera to a preset plane above or below the circle as $d_i$, letting a point located right above or right below the circle on the preset plane be q, letting the coordinate of the lens of the ith camera be $c_i$, letting the centers of circles formed by the optical centers of the lens of the multiple cameras be an origin O, and letting $\angle qc_iO$ be a top angle $\beta$, $\beta = \arctan(d/r_i)$, wherein $r_i$ is the distance from the lens of the ith camera to the centers of circles formed by the optical centers of the lens of the multiple cameras, that is, $r_i=|c_i|$, and a new top angle $\beta_j$ is trialed within the range of $0.9\beta$ to $1.1\beta$ to obtain a new distance $d_{ij}=\tan(\beta_j)\cdot r_i$ from each of the lens of each camera to a preset plane above or below the circles.

processing the lens of each camera sequentially until the height adjustment of the lens of all the cameras is completed.

In an embodiment of the present application, the operation of calculating a third mapping table corresponding to the lens of each camera according to the external parameters of the lens of each camera and the final distance from the lens of the camera to a preset plane above or below the circle may be specifically implemented according to the following equations:

$$p_{i0}^s = R_i \cdot p_i^s = [p_{i0x}^s, p_{i0y}^s, p_{i0z}^s],$$

$$p_{i1}^s = \begin{cases} d_{i1}/p_{i0z}^s \cdot p_{i0}^s c_i, & p_{i0z}^s \geq 0 \\ d_{i2}/-p_{i0z}^s \cdot p_{i0}^s - c_i, & p_{i0z}^s < 0 \end{cases},$$

$$p_i^s = f_3(p_i^s) = p_{i1}^s/|p_{i1}^s|,$$

wherein $f_3(p_i^s)$ is the third mapping table which represents the mapping of three-dimensional coordinates $p_i^s$ of a pixel point on a first spherical image of a lens of the ith camera to three-dimensional coordinates $p_i^s$ of the pixel point on the unified unit sphere, $1 \leq i \leq n$, n is the number of lens of the camera, $R_i$ is a rotation matrix of the lens of the ith camera relative to a reference lens, and $c_i$ is the position of the lens of the ith camera relative to the centers of circles formed by the optical centers of the lens of the multiple cameras, which is expressed in three-dimensional coordinates; $d_{i1}$ is the final distance from the lens of the ith camera to a preset plane above the circles formed by the optical centers of the lens of the multiple cameras, and $d_{i2}$ is the final distance from the lens of the ith camera to a preset plane below the circles.

In an embodiment of the present application, after S103, the method may further include the following steps:

projecting the panoramic spherical image to a plane according to a plane projection mode to obtain a planar image. The plane projection mode may include an equidistant cylindrical projection method, a cubic projection method or the like.

In an embodiment of the present application, after the operation of projecting the panoramic spherical image to a plane according to a plane projection mode to obtain a planar image, the method may further include the following step:

synthesizing the planar image into a video.

Figure 3:
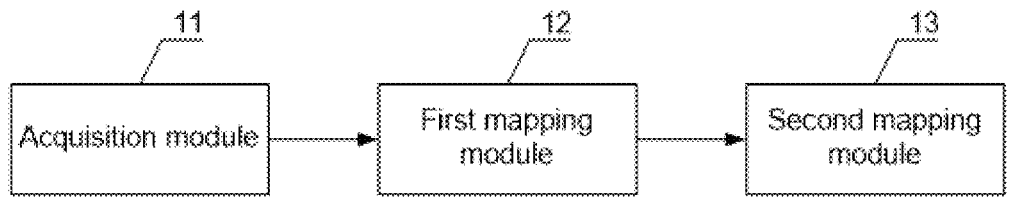
FIG. 3 is a schematic view of an image splicing apparatus according to an embodiment of the present application.

Referring to FIG. 3, an image splicing apparatus according to an embodiment of the present application may be a computer program or a program code running in a computer device or an image collecting device, for example, the image splicing apparatus is an application software; and the image splicing apparatus may be configured to execute corresponding steps in the image splicing method provided according to the embodiment of the present application. An image splicing apparatus according to an embodiment of the present application includes:

an acquisition module 11, being configured to respectively acquire internal parameters and external parameters of lens of multiple cameras, the distance from the centers of circles formed by the optical centers of the lens of the multiple cameras to a preset plane above or below the circles, and multiple images collected by the multiple cameras respectively, wherein the multiple images are images collected by the lens of the multiple cameras at the same time respectively;

a first mapping module 12, being configured to calculate a first mapping table corresponding to the lens of each camera according to the internal parameters of the lens of each camera, and project images collected by the corresponding lens of each camera at the same time onto a unit sphere according to the first mapping table corresponding to the lens of each camera so as to obtain multiple first spherical images respectively corresponding to the lens of each camera;

a second mapping module 13, being configured to calculate a second mapping table corresponding to the lens of each camera according to the external parameters of the lens of each camera and the distance from the centers of circles formed by the optical centers of the lens of the multiple cameras to a preset plane above or below the circles, and map the multiple first spherical images respectively corresponding to the lens of each camera to a unified unit sphere according to the second mapping table corresponding to the lens of each camera, and splice the first spherical images to obtain a panoramic spherical image.

The image splicing apparatus provided according to an embodiment of the present application belongs to the same concept as the image splicing method provided according to an embodiment of the present application, and reference may be made to the whole specification for the specific implementation process thereof, and thus this will not be further described herein.

An embodiment of the present application further provides a computer-readable storage medium storing a computer program, and the computer program, when executed by a processor, executes the steps of the image splicing method provided according to an embodiment of the present application.

Figure 4:
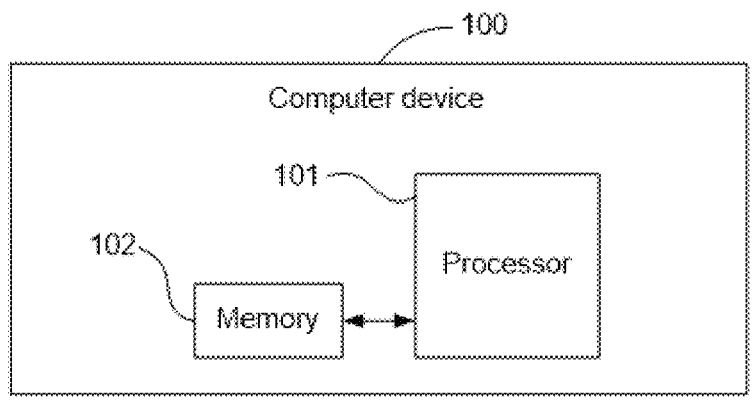
FIG. 4 is a specific structural block diagram of a computer device according to an embodiment of the present application.

FIG. 4 shows a specific structural block diagram of a computer device according to an embodiment of the present application, the computer device may be the computer device shown in FIG. 1, and a computer device 100 includes: one or more processors 101, a memory 102, and one or more computer programs, wherein the processor 101 and the memory 102 are connected by means of a bus, the one or more computer programs are stored in the memory 102 and configured to be executed by the one or more processors 101, and the processor 101 implements the steps of the image splicing method provided according to an embodiment of the present application when executing the computer program.

The computer device may be a desktop computer, a mobile terminal or the like, and the mobile terminal includes a mobile phone, a tablet computer, a notebook computer, a personal digital assistant or the like.

Figure 5:
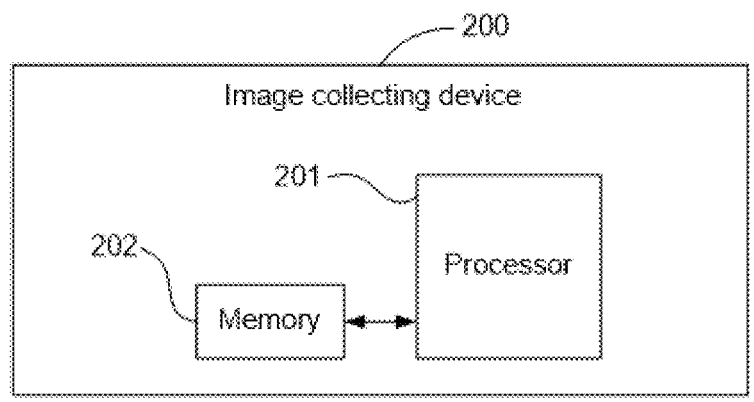
FIG. 5 is a specific structural block diagram of an image collecting device according to an embodiment of the present application.
Figure 6:
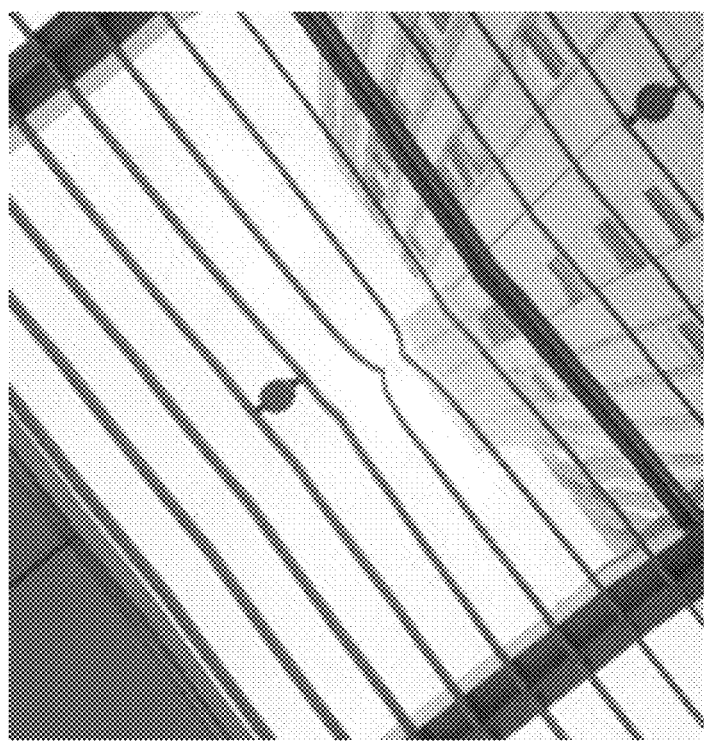
FIG. 6 is a diagram illustrating the top splicing effect in the prior art.
Figure 7:
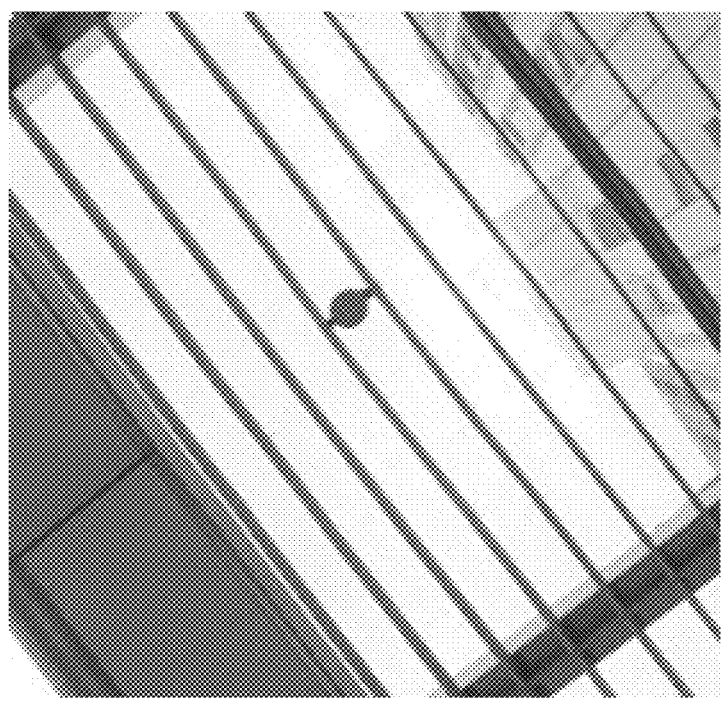
FIG. 7 is a diagram illustrating the top splicing effect of an image splicing method according to an embodiment of the present application is adopted.
Figure 8:
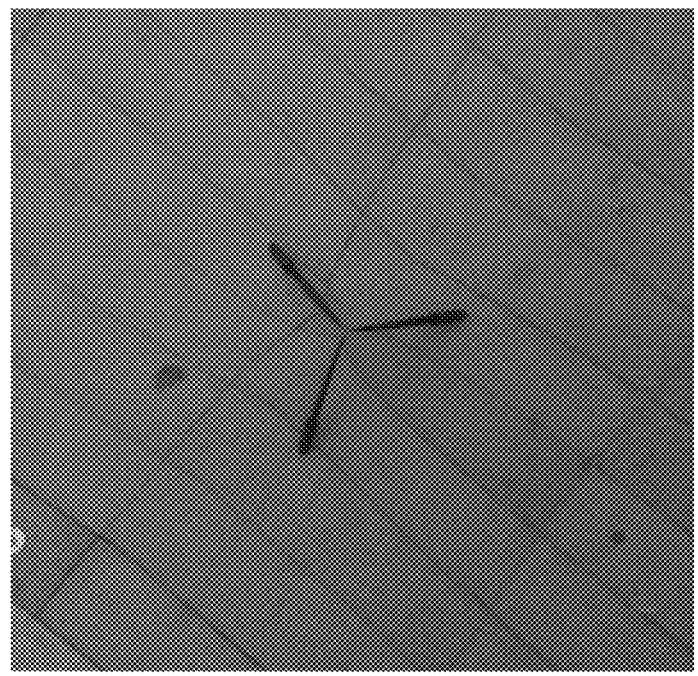
FIG. 8 is a diagram illustrating the bottom splicing effect in the prior art.
Figure 9:
FIG. 9 is a diagram illustrating the bottom splicing effect of an image splicing method according to an embodiment of the present application is adopted.

FIG. 5 shows a specific structural block diagram of an image collecting device according to an embodiment of the present application, the image collecting device may be the image collecting device shown in FIG. 1, and an image collecting device 200 includes: one or more processors 201, a memory 202, and one or more computer programs, wherein the processor 201 and the memory 202 are connected by means of a bus, the one or more computer programs are stored in the memory 202 and configured to be executed by the one or more processors 201, and the processor 201 implements the steps of the image splicing method provided according to an embodiment of the present application when executing the computer program.

Referring to FIG. 6 to FIG. 9, which are diagrams illustrating the top splicing effect and the bottom splicing effect respectively in the prior art and in the image splicing method according to an embodiment of the present application.

In the embodiments of the present application, sources of parallax between lens of multiple cameras (different positions of optical centers of lens of cameras) are introduced into the calculation of mapping tables, and it is assumed that areas above or below circles formed by the optical centers of the lens of the multiple cameras are a plane with a fixed height, a second mapping table corresponding to the lens of each camera is calculated according to the external parameters of the lens of each camera and the distance from the centers of circles formed by the optical centers of the lens of the multiple cameras to a preset plane above or below the circles, and multiple first spherical images respectively corresponding to the lens of each camera are mapped to a unified unit sphere according to the second mapping table corresponding to the lens of each camera, and the first spherical images are spliced to obtain a panoramic spherical image. In this way, not only the alignment error caused by parallax is solved, but a simple calculation process is still kept, and the complex calculation amount and the error risk caused by traditional three-dimensional reconstruction are avoided; and through actual testing, for photos and videos shot by image collecting devices statically placed in general indoor and outdoor environments, more natural and more real pictures spliced at the top and bottom can be obtained by using the image splicing method of the present application. It shall be appreciated that, the steps in the embodiments of the present application are not necessarily executed in sequence according to the order indicated by the step numbers. Unless explicitly stated herein, the execution of these steps is not strictly limited in order, and these steps may be executed in other orders. Moreover, at least part of the steps in the embodiments may include multiple sub-steps or multiple stages, these sub-steps or stages are not necessarily executed at the same time, but may be executed at different moments, and these sub-steps or stages are not necessarily executed in sequence, but may be executed in turn or alternately with at least part of other steps or sub-steps or stages of other steps.

As shall be appreciated by those of ordinary skill in the art, all or some of the processes in the method of the embodiments described above may be implemented by instructing related hardware by a computer program, the program may be stored in a non-volatile computer-readable storage medium, and when executed, the program may include the process flow of the embodiments for the methods described above. Any reference to memory, storage, database, or other medium used in the embodiments provided in the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration but not limitation, the RAM is available in various forms, such as a static RAM (SRAM), a dynamic RAM (DRAM), a synchronous DRAM (SDRAM), a dual data rate SDRAM (DDRSDRAM), an enhanced SDRAM (ESDRAM), a Synchlink DRAM (SLDRAM), a memory bus (Rambus) direct RAM (RDRAM), a direct Rambus dynamic RAM (DRDRAM), and a Rambus dynamic RAM (RDRAM), and the like.

The technical features of the above embodiments may be combined arbitrarily, and in order to make the description concise, not all possible combinations of the technical features in the embodiments described above are described; however, all these combinations shall be regarded as within the scope of the present specification as long as there is no contradiction among the combinations of these technical features.

The above embodiments merely express several embodiments of the present application which are described specifically in detailed, but these embodiments should not be thus construed as limitation on the patent scope of the present application. It shall be noted that, for those of ordinary skill in the art, several variations and improvements can be made without departing from the concept of the present application, and all those variations and improvements are within the scope claimed in the present application. Therefore, the scope claimed in the patent of the present application shall be governed by the appended claims.

What is claimed is:

1. An image splicing method for panoramic spherical image, wherein the method comprises:

acquiring internal parameters and external parameters of lens of multiple cameras, a distance from a center of circle formed by an optical center of lens of the multiple cameras to a preset plane above or below the circle, and multiple images collected by the multiple cameras respectively, wherein the multiple images are images collected by the lens of the multiple cameras at the same time respectively;

according to the internal parameters of the lens of each camera, calculating a first mapping table corresponding to the lens of each camera; and according to the first mapping table corresponding to the lens of each camera, projecting images collected by the corresponding lens of each camera at the same time onto a unit sphere to obtain multiple first spherical images respectively corresponding to the lens of each camera; and according to the external parameters of the lens of each camera and the distance from the center of circle formed by the optical center of the lens of the multiple cameras to a preset plane above or below the circle, calculating a second mapping table corresponding to the lens of each camera, and mapping the multiple first spherical images respectively corresponding to the lens of each camera to a unified unit sphere to obtain a panoramic spherical image by splicing, according to the second mapping table corresponding to the lens of each camera.

2. The method according to claim 1, wherein the unit sphere is specifically a unit sphere with the optical center of the lens serving as the center of sphere, and the unified unit sphere is specifically a unit sphere with the centers of circles formed by the optical centers of the lens of the multiple cameras serving as the center of sphere.

3. The method according to claim 1, wherein after the step of obtaining a panoramic spherical image by splicing, the method further comprises:

projecting the panoramic spherical image to a plane according to a plane projection mode to obtain a planar image.

4. The method according to claim 3, wherein after the step of projecting the panoramic spherical image to a plane according to a plane projection mode to obtain a planar image, the method further comprises: synthesizing the planar image into a video.

5. The method according to claim 3, wherein the plane projection mode comprises an equidistant cylindrical projection method and a cubic projection method.

6. The method according to claim 1, wherein the step of calculating a second mapping table corresponding to the lens of each camera according to the external parameters of the lens of each camera and the distance from the center of circle formed by the optical center of the lens of the multiple cameras to a preset plane above or below the circle is specifically implemented according to the following equations:

$$p_{i0}^s = R_i \cdot p_i^s = [p_{i0x}^s, p_{i0y}^s, p_{i0z}^s],$$

$$p_{i1}^s = \begin{cases} d_1/p_{i0z}^s \cdot p_{i0}^s - c_i, \, p_{i0z}^s \geq 0 \\ d_2/-p_{i0z}^s \cdot p_{i0}^s - c_i, \, p_{i0z}^s < 0 \end{cases},$$

$$p_i^{\hat{s}} = f_2(p_i^s) = p_{i1}^s/|p_{i1}^s|,$$

wherein $f_2(p_i^{\hat{s}})$ is the second mapping table which represents the mapping of three-dimensional coordinates $p_i^s$ of of a pixel point on a first spherical image of a lens of the ith camera to three-dimensional coordinates $p_i^{\hat{s}}$ of the pixel point on the unified unit sphere, $1 \leq i \leq n$, n is the number of lens of the camera, $R_i$ is a rotation matrix of the lens of the ith camera relative to a reference lens, and $c_i$ is the position of the lens of the ith camera relative to the centers of circles formed by the optical centers of the lens of the multiple cameras, which is expressed in three-dimensional coordinates; $d_1$ is the distance from the centers of circles formed by the optical centers of the lens of the multiple cameras to a preset plane above the circles, and $d_2$ is the distance from the centers of circles formed by the optical centers of the lens of the multiple cameras to a preset plane below the circles, $p_{i0}^s$ is a obtained point after rotating and transforming the three-dimensional coordinates $p_i^s$ of a pixel point on a first spherical image using $R_i$, and the three-dimensional coordinates of $p_{i0}^s$ are represented by $[p_{i0x}^s, p_{i0y}^s, p_{i0z}^s]$.

7. The method according to claim 1, wherein if the multiple cameras are placed in a room, then the distance from the centers of circles formed by the optical centers of the lens of the multiple cameras to a preset plane above the circles is the distance from the centers of circles to a top of the room, while the distance from the centers of circles formed by the optical centers of the lens of the multiple cameras to a preset plane below the circles is the distance from the centers of circles to a bottom of the room.

8. The method according to claim 1, wherein the distance from the centers of circles formed by the optical centers of the lens of the multiple cameras to a preset plane above or below the circles is specifically acquired by the following steps:
acquiring the distance from the centers of circles formed by the optical centers of the lens of the multiple cameras to a preset plane above or below the circles by using a distance sensor; or automatically estimating the distance from the centers of circles formed by the optical centers of the lens of the multiple cameras to a preset plane above or below the circles.

9. The method according to claim 8, wherein the step of automatically estimating the distance from the centers of circles formed by the optical centers of the lens of the multiple cameras to a preset plane above or below the circles specifically comprises the following operations:
selecting multiple distances within a preset distance range, wherein the multiple distances are distances from the centers of circles formed by the optical centers of the lens of the multiple cameras to multiple preset planes above or below the circles, and for each of the distances selected, respectively calculating a second mapping table corresponding to the lens of each camera according to the external parameters of the lens of each camera and each of the distances; mapping multiple first spherical images respectively corresponding to the lens of each camera to the unified unit sphere according to the second mapping table corresponding to the lens of each camera to obtain multiple unified unit spherical images respectively corresponding to the lens of each camera;
for each of the unified unit spherical images corresponding to the lens of each camera, projecting a part of the upper hemisphere of the unified unit spherical image to a plane which is at the selected distance from the centers of circles formed by the optical centers of the lens of the multiple cameras and above the circles according to the plane projection mode so as to obtain top projection pictures, and projecting a part of the lower hemisphere of the unified unit spherical image to a plane which is at the selected distance from the centers of circles formed by the optical centers of the lens of the multiple cameras and below the circles according to the plane projection mode so as to obtain bottom projection pictures; and
calculating an overall alignment error of the top projection pictures or the bottom projection pictures; and taking the distance corresponding to the minimum overall alignment error of the top projection pictures or the bottom projection pictures as the distance from the centers of circles formed by the optical centers of the lens of the multiple cameras to a preset plane above or below the circles.

10. The method according to claim 9, wherein the step of selecting multiple distances within a preset distance range specifically comprises:
letting the vertical viewing angle of the lens be a, and letting the average distance from the lens of each camera to the centers of circles formed by the optical centers of the lens of the multiple cameras be r, and the number of different distances which are trialed in order of size is m, wherein m is an integer greater than or equal to 2, and the calculation method for the jth distance $d_j$ trialed is as follows:

$$d_j = r \cdot \arctan(2/(\alpha-\pi) \cdot m/j), j \in [1, m].$$

11. The method according to claim 9, wherein the step of calculating an overall alignment error of the top projection pictures or the bottom projection pictures specifically comprises:
for the lens of each camera, respectively calculating an average pixel error within the overlapping area between the top projection pictures or the bottom projection pictures corresponding to the lens of two cameras adjacent to the lens of each camera;
calculating the sum of the average pixel errors of the lens of all the cameras as the overall alignment error of the top projection pictures or the bottom projection pictures.

12. The method according to claim 11, wherein the step of calculating the overall alignment error of the top projection pictures or the bottom projection pictures is specifically implemented by the following equation:

$E(d_j)=\Sigma_i^n D(P_{i,j}, P_{i+1,j})$, wherein $1 \le i \le n$, n represents the number of the lens of the cameras, $E(d_j)$ represents the overall alignment error of the top projection pictures or the bottom projection pictures at the jth distance di trialed, $D(P_{i,j}, P_{i+1,j})$ represents the average pixel error at the jth distance $d_j$ trialed within the overlapping area between the top projection pictures or the bottom projection pictures corresponding to the lens of the ith camera and the lens of the (i+1)th camera which are adjacent to each other.

13. The method according to claim 9, wherein after the step of taking the distance corresponding to the minimum overall alignment error of the top projection pictures or the bottom projection pictures as the distance from the centers of circles formed by the optical centers of the lens of the multiple cameras to a preset plane above or below the circles, the method further comprises the following operations:

according to the estimated distance from the centers of circles formed by the optical centers of the lens of the multiple cameras to a preset plane above or below the circles, controlling to adjust the distance from the lens of each camera to the preset plane so that the alignment error between the lens of each camera and the lens of two cameras adjacent thereto is minimum, and taking the distance from the lens of the camera to the preset plane when the alignment error between the lens of each camera and the lens of two cameras adjacent thereto is minimum as the final distance from the lens of the camera to a preset plane above or below the circle;

calculating a third mapping table corresponding to the lens of each camera respectively according to the external parameters of the lens of each camera and the final distance from the lens of the camera to a preset plane above or below the circle;

the operation of splicing the first spherical images to obtain a panoramic spherical image specifically comprises: mapping multiple first spherical images respectively corresponding to the lens of each camera to a unified unit sphere according to the third mapping table corresponding to the lens of each camera, and splicing the first spherical images to obtain a panoramic spherical image.

14. The method according to claim 13, wherein the step of controlling to adjust the distance from the lens of each camera to the preset plane according to the estimated distance from the centers of circles formed by the optical centers of the lens of the multiple cameras to a preset plane above or below the circles so that the alignment error between the lens of each camera and the lens of two cameras adjacent thereto is minimum specifically comprises:

respectively calculating a second mapping table corresponding to the lens of each camera according to the external parameters of the lens of each camera and the estimated distance from the centers of circles formed by the optical centers of the lens of the multiple cameras to a preset plane above or below the circles;

mapping multiple first spherical images respectively corresponding to the lens of each camera to an unified unit sphere according to the second mapping table corresponding to the lens of each camera to obtain multiple unified unit spherical images respectively corresponding to the lens of each camera;

for each of the unified unit spherical images corresponding to the lens of each camera, projecting a part of the upper hemisphere of the unified unit spherical image to a plane which is at the selected distance from the centers of circles formed by the optical centers of the lens of the multiple cameras and above the circles according to the plane projection mode so as to obtain top projection pictures, and projecting a part of the lower hemisphere of the unified unit spherical image to a plane which is at the selected distance from the centers of circles formed by the optical centers of the lens of the multiple cameras and below the circles according to the plane projection mode so as to obtain bottom projection pictures;

according to the top projection pictures or the bottom projection pictures corresponding to the lens of each camera, calculating an alignment error between the lens of each camera and the lens of two cameras adjacent thereto, and sorting the lens of all the cameras in a descending order according to the alignment error;

starting from the lens of the camera with the maximum alignment error, adjusting the height of the lens in the vicinity of the estimated distance from the centers of circles formed by the optical centers of the lens of the multiple cameras to a preset plane above or below the circles until the alignment error is minimum;

processing the lens of each camera sequentially until the height adjustment of the lens of all the cameras is completed.

15. The method according to claim 14, wherein the step of calculating an alignment error between the lens of each camera and the lens of two cameras adjacent thereto according to the top projection pictures or the bottom projection pictures corresponding to the lens of each camera specifically comprises:

calculating an average pixel error within the overlapping area between the top projection pictures or the bottom projection pictures corresponding to the lens of each camera and the lens of two cameras adjacent thereto.

16. The method according to claim 14, wherein the step of adjusting the height of the lens in the vicinity of the estimated distance from the centers of circles formed by the optical centers of the lens of the multiple cameras to a preset plane above or below the circles specifically comprises:

recording the estimated distance from the centers of circles formed by the optical centers of the lens of the multiple cameras to a preset plane above or below the circles as d, adjusting the distance $d_i$ from each of the lens of each camera to a preset plane above or below the circle, letting a point located right above or right below the circle on the preset plane be q, letting the coordinate of the lens of the ith camera be $c_i$, letting the centers of circles formed by the optical centers of the lens of the multiple cameras be an origin O, and letting $\angle qc_iO$ be a top angle $\beta$, $\beta=\arctan(d/r_i)$, wherein $r_i$ is the distance from the lens of the ith camera to the centers of circles, that is, $r_i=|c_i|$, and a new top angle $\beta_j$ is trialed within the range of $0.9\beta$ to $1.1\beta$ to obtain a new distance $d_{ij}=\tan(\beta_j) \cdot r_i$ from each of the lens of each camera to a preset plane above or below the circles.

17. The method according to claim 13, wherein the step of calculating a third mapping table corresponding to the lens of each camera according to the external parameters of the lens of each camera and the final distance from the lens of the camera to a preset plane above or below the circle is specifically implemented according to the following equations:

$$p_{i0}^s = R_i \cdot p_i^{\hat{s}} = [p_{i0x}^s, p_{i0y}^s, p_{i0z}^s],$$

$$p_{i1}^s = \begin{cases} d_{i1}/p_{i0z}^s \cdot p_{i0}^s c_i, & p_{i0z}^s \geq 0 \\ d_{i2}/-p_{i0z}^s \cdot p_{i0}^s - c_i, & p_{i0z}^s < 0 \end{cases},$$

$$p_i^s = f_3(p_i^{\hat{s}}) = p_{i1}^s/|p_{i1}^s|$$

wherein $f_3(p_i^{\hat{s}})$ is the third mapping table which represents the mapping of three-dimensional coordinates $p_i^{\hat{s}}$ of a pixel point on a first spherical image of a lens of the ith camera to three-dimensional coordinates $p_i^s$ of the pixel point on the unified unit sphere, 1≤i≤n, n is the number of lens of the camera, $R_i$ is a rotation matrix of the lens of the ith camera relative to a reference lens, and $c_i$ is the position of the lens of the ith camera relative to the centers of circles formed by the optical centers of the lens of the multiple cameras, which is expressed in three-dimensional coordinates; $d_{i1}$ is the final distance from the lens of the ith camera to a preset plane above the circles, and $d_{i2}$ is the final distance from the lens of the ith camera to a preset plane below the circles, $p_{i0}^s$ is a obtained point after rotating and transforming the three-dimensional coordinates $p_i^{\hat{s}}$ of a pixel point on a first spherical image using $R_i$, and the three-dimensional coordinates of $p_{i0}^s$ are represented by $[p_{i0x}^s, p_{i0y}^s, p_{i0z}^s]$.

18. A non-volatile computer-readable storage medium storing a computer program, wherein the computer program, when executed by a processor, implements the steps of the image splicing method for panoramic spherical image according to claim 1.

19. A computer device, comprising:
one or more processors;
a memory; and
one or more computer programs, the processors and the memory being connected through a bus, wherein the one or more computer programs are stored in the memory and are configured to be executed by the one or more processors, wherein the processor, when executing the computer programs, implements the steps of the image splicing method for panoramic spherical image according to claims 1.

* * * * *